United States Patent
Rix et al.

(10) Patent No.: US 7,171,553 B2
(45) Date of Patent: Jan. 30, 2007

(54) METHOD FOR PROVIDING A SECURE COMMUNICATION BETWEEN TWO DEVICES AND APPLICATION OF THIS METHOD

(75) Inventors: Simon Paul Ashley Rix, Transvaal (ZA); Andrew Glasspool, Basingstoke (GB); Donald Watts Davies, Middlesex (GB)

(73) Assignee: Irdeto Access B.V., Hoofddorp (NL)

( * ) Notice: Subject to any disclaimer, the term of this patent is extended or adjusted under 35 U.S.C. 154(b) by 879 days.

(21) Appl. No.: 10/101,122

(22) Filed: Mar. 18, 2002

(65) Prior Publication Data

US 2002/0126844 A1 Sep. 12, 2002

Related U.S. Application Data

(63) Continuation of application No. 09/155,782, filed on Apr. 2, 1999, now Pat. No. 6,385,317.

(51) Int. Cl.
*H04L 9/00* (2006.01)

(52) U.S. Cl. .................. 713/155; 713/170; 380/282; 380/30

(58) Field of Classification Search ............... 713/155, 713/168, 170; 380/239, 255, 282, 30, 229, 380/232, 241, 285
See application file for complete search history.

(56) References Cited

U.S. PATENT DOCUMENTS

| | | | |
|---|---|---|---|
| 4,238,853 A | 12/1980 | Ehrsam et al. | |
| 4,531,020 A | 7/1985 | Wechselberger et al. | |
| 4,868,877 A | 9/1989 | Fischer | |
| 4,887,296 A | 12/1989 | Horne | |
| 5,029,207 A | 7/1991 | Gammie | |
| 5,048,085 A | 9/1991 | Abraham et al. | |
| 5,054,064 A | 10/1991 | Walker et al. | |

(Continued)

FOREIGN PATENT DOCUMENTS

EP 0428252 A2 5/1991

(Continued)

OTHER PUBLICATIONS

Francoise Coutrot et al., "A Single Conditional Access System For Satellite-Cable And Terrestrial TV", IEEE Transactions On Consumer Electronics, vol. 35, No. 3, Aug. 1, 1989.

(Continued)

*Primary Examiner*—Joseph D. Torres
(74) *Attorney, Agent, or Firm*—Schwegman, Lundberg, Woessner & Kluth, P.A.

(57) ABSTRACT

A method of providing a secure communication between first and second devices is described. The method includes encrypting a random key using an encryption key at a first device and transferring the encrypted random key to the second device for encryption of data communicated from the second device to the first device. The encrypted data received from the second device is decrypted using the random key. The method typically includes transferring a control word encrypted with an encryption key to the second device for decryption, and encryption using the random key. The encrypted control word received from the second device is then decrypted using the random key. The invention extends to a method of enabling a decoder, and to a decoder, to decode a data stream. It also extends, inter alia, to a method of authenticating an enabling device and to an enabling device.

55 Claims, 2 Drawing Sheets

U.S. PATENT DOCUMENTS

| | | | |
|---|---|---|---|
| 5,111,504 | A | 5/1992 | Esserman et al. |
| 5,159,633 | A | 10/1992 | Nakamura |
| 5,237,610 | A | 8/1993 | Gammie et al. |
| 5,282,249 | A | 1/1994 | Cohen et al. |
| 5,420,866 | A | 5/1995 | Wasilewski |
| 5,600,378 | A | 2/1997 | Wasilewski |
| 5,625,693 | A | 4/1997 | Rohatgi et al. |
| 5,742,677 | A | 4/1998 | Pinder et al. |
| 5,870,474 | A | 2/1999 | Wasilewski et al. |
| 6,038,320 | A | 3/2000 | Miller |
| 6,038,321 | A | 3/2000 | Torigai et al. |

FOREIGN PATENT DOCUMENTS

| | | |
|---|---|---|
| EP | 0689316 A2 | 12/1995 |
| EP | 0658054 B1 | 9/1998 |
| WO | WO-9738530 | 10/1997 |

OTHER PUBLICATIONS

EBU Project Group B/CA, "Functional Model of a Conditional Access System", EBU Technical Review, No. 266, pp. 64-77, (Winter 1995).

Andy Trott, "An Enhanced Cost Effective Line Shuffle Scrambling System with Secure Conditional Access Authorization", NCTA Technical Papers, pp. 133-143, (Jun. 6, 1993).

A copy of PCT International Search Report mailed on Jul. 4, 1997 (3 pages).

Davies, DW and Price, WL, "Issues in the Design of a Key Distribution Centre", National Physical Laboratory, Apr. 1981, pp. 1-22, ISSN 0143-7348, Teddington, Middlesex TW11 OLW UK.

Lennon, R.E., Matyas, S.M., Meyer, C.H., "Cryptographic Key Distribution for Terminal Communications", IBM Technical Disclosure Bulletin, Jul. 1979, pp. 636-639, vol. 22, No. 2.

Notice of Opposition to European Patent No. 0 891 670.

Schneier, Bruce, "Applied Cryptography; Protocols, Algorithms, and Source Code in C", Book 1996, Chapters 2-3, Second Edition, John Wiley & Sons, Inc., USA.

Merkle, Ralph C., "Protocols for Public Key Cryptosystems", ELXSI International, 1980, pp. 122-134, Sunnyvale, California.

"Appeal/Grounds of Appeal", May 20, 2003, 9 pages.

"Decision Revoking the European Patent EP-B-0891670", *European Patent Office*, (Jan. 16, 2003), 17 pages.

METHOD FOR PROVIDING A SECURE COMMUNICATION BETWEEN TWO DEVICES AND APPLICATION OF THIS METHOD

The present patent application is a continuation of prior application Ser. No. 09/155,782, filed Apr. 2, 1999 now U.S. Pat. No. 6,385,317, entitled METHOD FOR PROVIDING A SECURE COMMUNICATION BETWEEN TWO DEVICES AND APPLICATION OF THIS METHOD The present invention relates to a method for providing a secure communication between two devices, in particular between devices used in a pay TV system.

In a pay TV system each subscriber generally has a decoder for descrambling the source component signal, wherein said decoder comprises a conditional access module and a smart card for decrypting entitlement control messages and entitlement management messages. In order to prevent unauthorized operation of the decoder for descrambling a source component signal it is important to prevent switching between an authorized and an unauthorized smart card for example.

The invention aims to provide a method of the above-mentioned type wherein the communication between two devices, such as the control access module and the smart card or the decoder and the conditional access module, is arranged in such a manner that switching between authorized and unauthorized devices is not possible.

According to the invention a method is provided, wherein a first device generates a random key (Ci) and transfers said key to a second device in a first message encrypted using a public key, wherein said second device decrypts the first encrypted message by means of a corresponding secret key to obtain said random key (Ci), wherein said random key is used to encrypt and decrypt further transmissions between said devices.

According to the invention this method can be applied in a decoder for a pay TV system, wherein said decoder comprises a conditional access module and a smart card, wherein said method is applied to provide a secure communication between the control access module and the smart card or between the decoder and the conditional access module.

The invention further provides a decoder for a pay TV system, comprising a conditional access module and a smart card, said conditional access module comprising means for generating a random key (Ci), means for encrypting said key in a first encrypted message using a public key encryption method, means for transfering said first encrypted message to the smart card, said smart card comprising means for receiving and decrypting said first encrypted message to obtain said random key, means for encrypting transmissions to the conditional access module under said random key, said conditional access module having means to decrypt said transmissions received from the smart card.

In a further embodiment of the invention, said decoder comprises a conditional access module and a smart card, wherein said decoder comprises means for generating a random key (Ci), means for encrypting said key in a first encrypted message using a public key encryption method, means for transfering said first encrypted message to the conditional access module, said conditional access module comprising means for receiving and decrypting said first encrypted message to obtain said random key, means for encrypting transmissions to the decoder under said random key, said decoder having means to decrypt said transmissions received from the conditional access module.

The invention will be further explained by reference to the drawings in which an embodiment of the method of the invention is explained as applied in a decoder for a pay TV system.

Figure 1:
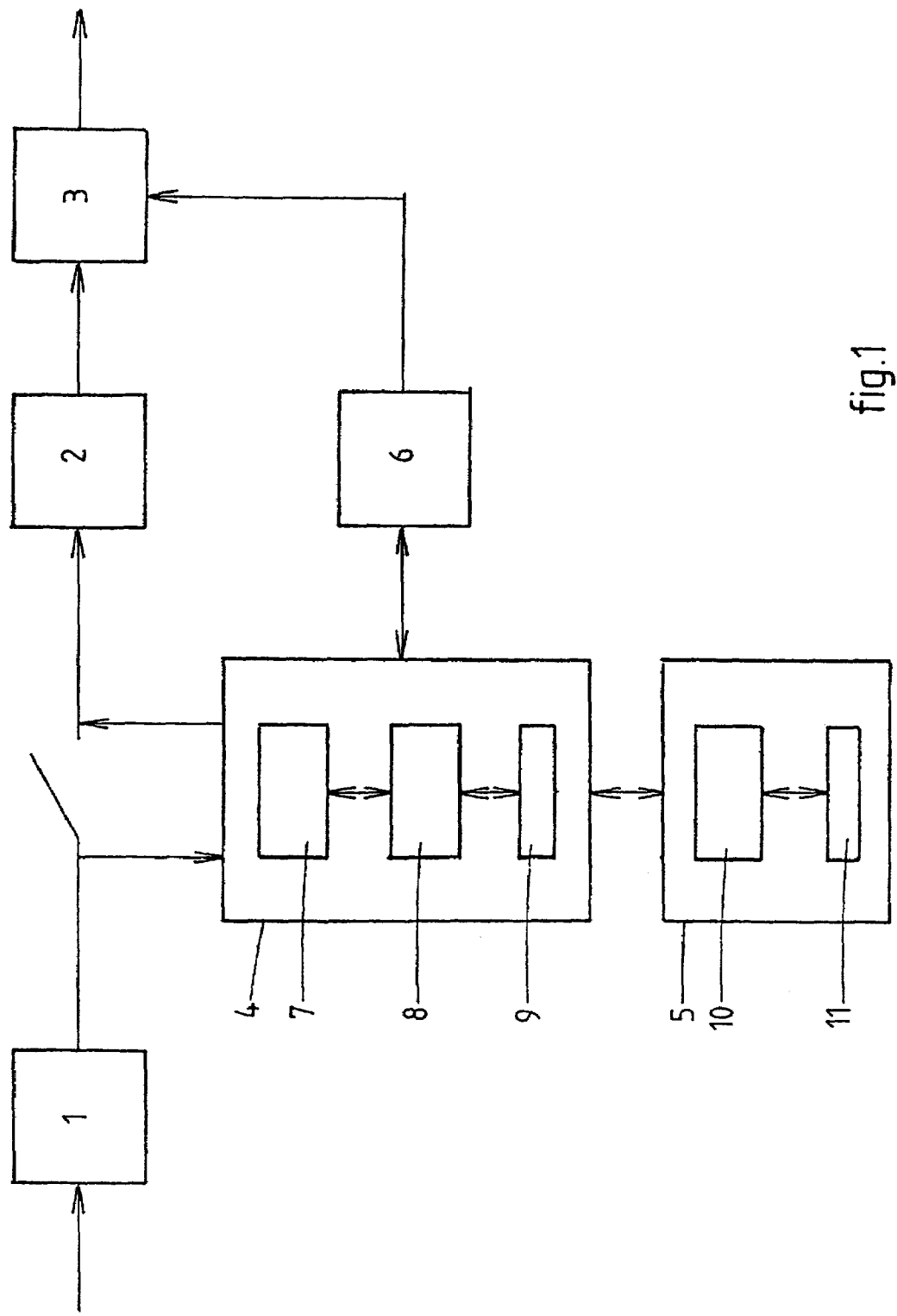
FIG. 1 shows a block diagram of an embodiment of the decoder according to the present invention.

Referring to FIG. 1 there is shown in a very schematical manner a block diagram of a decoder for a pay TV system, wherein digital information signals are scrambled using a control word in accordance with the Eurocrypt standard for example. In this embodiment the decoder comprises a demodulator 1, a demultiplexer 2 and a decompression unit 3. The decoder further comprises a conditional access module or CAM 4 and a smart card 5 which can be inserted into a connection slot of the conditional access module 4. Further the decoder is provided with a microprocessor 6 for configuration and control purposes.

The conditional access module 4 is provided with a descrambler unit 7 and a microprocessor 8 having a memory 9. The smart card 5 comprises a microprocessor 10 having a memory 11.

As the operation of the above-mentioned parts of the decoder is not a part of the present invention, this operation will not be described in detail. Typically, the signal received by the demodulator 1 is a modulated data stream between 950 MHz and 2050 MHz. The output of the demodulator 1 is a scrambled digital data stream which is provided to the CAM 4 and the descrambler 7 will be allowed to descramble this scrambled data stream assuming that an authorized smart card has been inserted and the subscriber is entitled to receive the program. The descrambled data stream is demultiplexed by the demultiplexer 2 and decompressed and converted into the original analogue audio and video signal by the decompression unit 3.

In a pay TV system the control word required for descrambling, is transferred to the subscribers in so-called entitlement control messages containing the control word encrypted using a service key. This service key is downloaded in the memory 11 of the smart card 5 by means of a so-called entitlement management message for example. During operation the CAM 4 transfers the entitlement control messages towards the microprocessor 10 of the smart card 5 so that the microprocessor 10 can process the entitlement control message and extract the control word. Thereafter the smart card 5 returns the decrypted control word towards the CAM 4 so that the descrambler 7 is allowed to descramble the digital data stream received from the demodulator 1.

Figure 2:
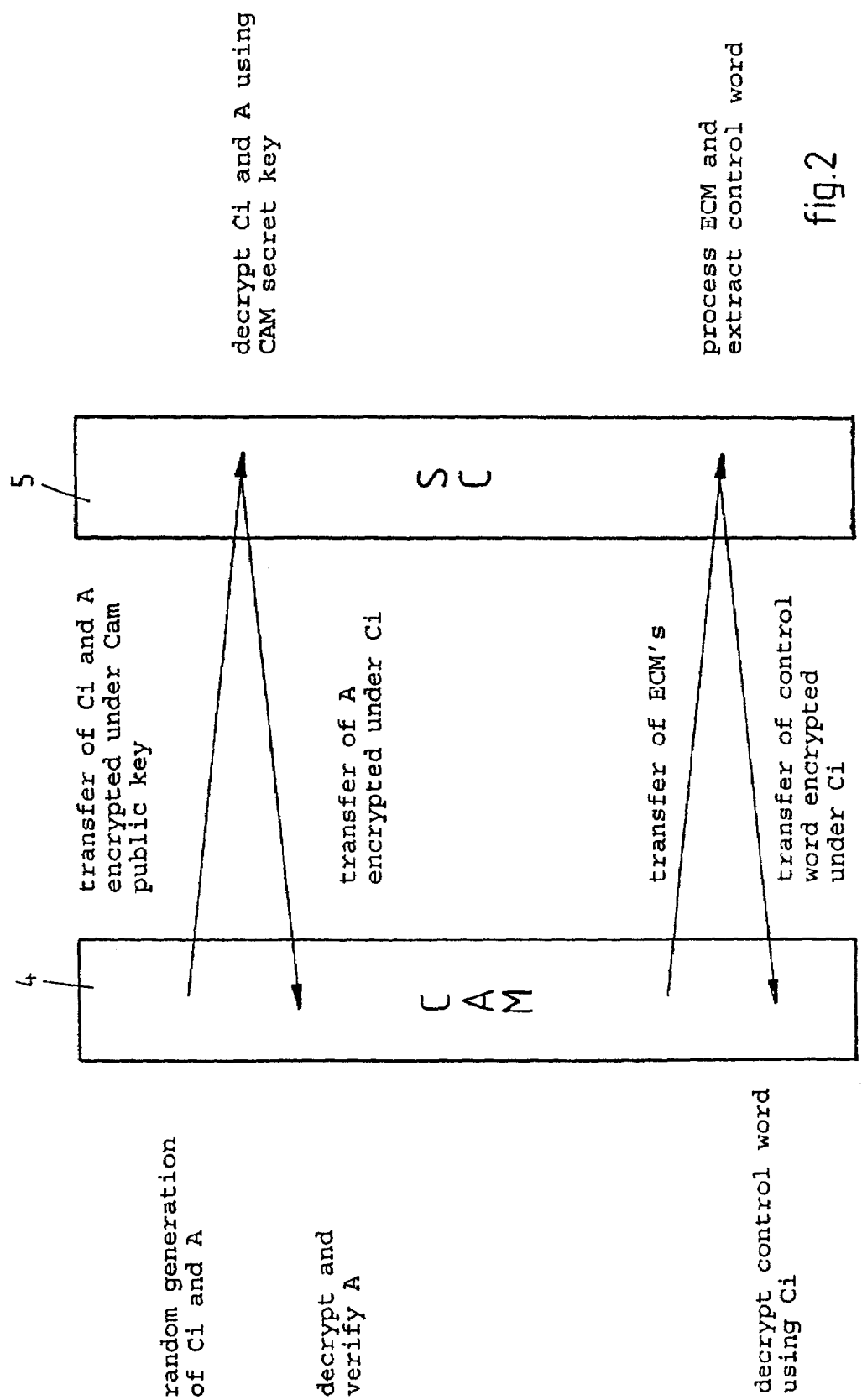
FIG. 2 shows a sequence of steps of an embodiment of the method of the invention.

In order to prevent the use of an unauthorized smart card 5 in combination with the CAM 4 it is important to provide a secure communication between the CAM 4 and the smart card 5. According to the present invention the following method is used to provide such a secure communication. The steps of this method are shown in FIG. 2. When a smart card is inserted into the decoder, the microprocessor 8 of the CAM 4 will generate two random numbers Ci and A. The microprocessor 8 will encrypt in a first message the random numbers Ci and A under a public key of the CAM 4. The thus obtained first message is transferred to the smart card 5 and the microprocessor 10 will decrypt this first message using the secret key of the CAM 4. Thereafter the microprocessor 10 will return a second message to the CAM 4, said second message being the random number A encrypted under the number Ci used as encryption key. The microprocessor 8 of the CAM 4 decrypts this second message and verifies whether the random number A is correct. Assuming that the random number A is indeed correct, so that it may be assumed that the inserted smart card 5 is an authorized smart card, the CAM 4 will then forward entitlement control messages containing the encrypted control word to the smart card 5 which will process the entitlement control message and extract the control word in a conventional manner. However, in the return message towards the CAM 4, the smart card will forward the extracted control word encrypted under the key Ci and these encrypted control words are decrypted by the microprocessor 8 using the same key Ci. As soon as one tries to replace the inserted smart card 5 by an other smart card, for example by switching from the authorized smart card 5 to an unauthorized smart card, the CAM 4 will immediately establish such change as the key Ci will not be known to the new smart card, so that the CAM will no longer be able to descramble the return messages containing the control word. Thereby the descrambler unit 7 will be disabled.

The method described can be used in the same manner for providing a secure communication between the CAM 4 and the decoder, wherein the same protocol as shown in FIG. 2 is followed.

In summary it will be understood that if a new CAM 4 is connected to the other decoder parts, the microprocessor 6 of the decoder will generate the two random numbers Ci and A and as soon as the microprocessor 6 has decrypted the second message received from the microprocessor 8 of the CAM 4, and has verified that the random number A is correct, the key Ci will be used in all transmissions between the CAM 4 and the microprocessor 6.

The invention is not restricted to the above-described embodiments which can be varied in a number of ways within the scope of the claims. As an example for a further embodiment the CAM (i.e. the descrambler) may be part of the decoder. The decoder would now challenge the smart card to authenticate itself to obtain a secure communication between the smart card and the decoder.

The invention claimed is:

1. A method for providing a secure communication between a first device and a second device in a pay TV system, comprising:
   generating a first key associated with the first device;
   encrypting a first message, including the first key, with a public key associated with the first device;
   transferring the first encrypted message to the second device;
   decrypting the first encrypted message, at the second device, using a secret key corresponding to the public key, to obtain the first key;
   encrypting a second message including an authentication using the first key as a key;
   returning the second encrypted message to the first device;
   decrypting the second encrypted message;
   verifying that the authentication in the decrypted second message is correct; and
   if verified, using the first key to encrypt at least one subsequent transmission between the first and second devices.

2. The method of claim 1, wherein the first key is a random number.

3. The method of claim 2, wherein the authentication includes a random number.

4. The method of claim 3, wherein the authentication random number is transferred to the second device in the same message as the first key.

5. The method of claim 3, wherein,
   after verification,
   the first device forwards at least one message including an encrypted control word to the second device,
   upon receipt of which, the second device
   extracts the control word; and
   returns the control word to the first device in a message encrypted using the first key.

6. The method of claim 3, wherein
   the first device is a conditional access module; and
   the second device is a smart card.

7. The method of claim 3, wherein the first device is a decoder in the pay TV system.

8. Apparatus for providing a secure communication in a pay TV system, the apparatus comprising:
   a first device including at least one microprocessor and being configured to:
   generate a first key associated with the first device;
   encrypt a first message, including the first key, with a public key associated with the first device; and
   transfer the first encrypted message; and
   a second device including at least one microprocessor and being configured to:
   receive the first encrypted message,
   decrypt the first encrypted message, by using a secret key corresponding to the public key, to obtain the first key,
   encrypt a second message containing an authentication using the first key as a key, and
   return the second encrypted message to the first device;
   the first device being further configured to:
   decrypt the second encrypted message for verification upon which, the apparatus uses the first key to encrypt at least one subsequent transmission between the first and second devices.

9. The apparatus of claim 8, wherein the first key is a random number.

10. The apparatus of claim 9, wherein the authentication includes a random number.

11. The apparatus of claim 10, wherein the authentication random number is transferred to the second device in the same message as the first key.

12. The apparatus of claim 8, wherein, after verification,
    the first device is further configured to forward at least one message including an encrypted control word to the second device,
    upon receipt of which, the second device is further configured to:
    extract the control word; and
    return the control word to the first device in a message encrypted using the first key.

13. The apparatus of claim 8, wherein
    the first device is a conditional access module; and
    the second device is a smart card.

14. The apparatus of claim 8, wherein the first device is a decoder in the pay TV system.

15. A method of providing secure communications with a device for use in a pay TV system, comprising:
    generating a first key associated with the device;
    encrypting a first message, including the first key, with a public key associated with the device;
    transferring the first encrypted message from the device;
    receiving a second encrypted message at the device;
    the second message including an authentication and being encrypted using the first key;
    decrypting the second encrypted message;

verifying that the authentication in the decrypted second message is correct; and
if verified,
   using the first key to encrypt at least one subsequent transmission from the first device.

16. The method of claim 15, wherein the first key is a random number.

17. The method of claim 16, wherein the authentication includes a random number.

18. The method of claim 17, wherein the authentication random number is transferred in the same message as the first key.

19. The method of claim 17, wherein the device generates the first key and the authentication random number.

20. The method of claim 15, wherein,
after verification,
   the first device transmits at least one message including an encrypted control word, and
in response
   receives the control word in a message encrypted using the first key.

21. The method of claim 15, wherein the device is a conditional access module.

22. The method of claim 15, wherein the device is a decoder in the pay TV system.

23. An apparatus to provide secure communications in a pay TV system, the apparatus comprising a device, including at least one microprocessor and being configured to:
   generate a first key associated with the device;
   encrypt a first message, including the first key, with a public key associated with the device;
   transfer the first encrypted message from the device;
   receive a second encrypted message at the device, the second message including an authentication and being encrypted using the first key;
   decrypt the second encrypted message;
   verify that the authentication in the decrypted second message is correct; and
   if verified, use the first key to encrypt at least one subsequent transmission from the first device.

24. The apparatus of claim 23, wherein the first key is a random number.

25. The apparatus of claim 24, wherein the authentication includes a random number.

26. The apparatus of claim 25, wherein the device is further configured to transfer the authentication random number in the same message as the first key.

27. The apparatus of claim 23, wherein the device is further configured to
   after verification, transmit at least one message including an encrypted control word, and
   in response, receive the control word in a message encrypted using the first key.

28. The apparatus of claim 23, wherein the device is a conditional access module in the pay TV system.

29. The apparatus of claim 23, wherein the device is a decoder in the pay TV system.

30. A method of providing secure communications with a device in a pay TV system, comprising:
   receiving a first encrypted message, including a first key, and encrypted with a public key;
   decrypting the first encrypted message using a secret key corresponding to the public key;
   transmitting a second message to a remote device for verification;
      the second message including an authentication and being encrypted using the first key; and
   if verification occurs, receiving or transmitting at least one subsequent transmission encrypted using the first key.

31. The method of claim 30, wherein the first key is a random number.

32. The method of claim 31, wherein the authentication includes a random number.

33. The method of claim 32, wherein the authentication random number is received in the same message as the first key.

34. The method of claim 30, wherein,
after verification,
   the device receives at least one message including an encrypted control word, and
in response,
   decrypts and then transmits the control word in a message encrypted using the first key.

35. The method of claim 30, wherein the device is a smart card for use in a pay TV system.

36. The method of claim 30, wherein the device is configured to cooperate with a decoder in a pay TV system.

37. An apparatus to provide secure communications in a pay TV system, the apparatus comprising a device, including at least one microprocessor and being configured to:
   receive a first encrypted message, including a first key, and encrypted with a public key;
   decrypt the first encrypted message using a secret key corresponding to the public key;
   transmit a second message to a remote device for verification;
      the second message including an authentication and being encrypted using the first key; and
   if verification occurs, receive or transmit at least one subsequent transmission encrypted using the first key.

38. The apparatus of claim 37, wherein the first key is a random number.

39. The apparatus of claim 38, wherein the authentication includes a random number.

40. The apparatus of claim 39, wherein the random number is transferred in the same message as the first key.

41. The apparatus of claim 37, wherein, the device is configured to:
   after verification, receive at least one message including an encrypted control word, and
   in response, decrypt and then transmit the control word in a message encrypted using the first key.

42. The apparatus of claim 37, wherein the device is a smart card for use in the pay TV system.

43. The apparatus of claim 37, wherein the device is configured to cooperate with a decoder in the pay TV system.

44. A method for providing a secure communication between a first device and a second device, the method including:
   generating a first key and an authentication number, both associated with the first device;
   encrypting a first message, including the first key and the authentication number;
   transferring the first encrypted message to the second device;
   decrypting the first encrypted message at the second device, to obtain the first key and the authentication number;
   encrypting a second message, including the first key and the authentication number;
   returning the second encrypted message to the first device;

decrypting the second encrypted message;

verifying that the authentication number in the decrypted second message is correct; and if verified, using the first key to encrypt at least one subsequent transmission between the first and second devices.

45. The method of claim 44, wherein the first key is a random number.

46. The method of claim 44, wherein the authentication number is a random number.

47. The method of claim 44, wherein, after verification, the first device forwards at least one message including an encrypted control word to the second device, upon receipt of which, the second device extracts the control word; and returns the control word to the first device in a message encrypted using the first key.

48. The method of claim 44, wherein the first device is a conditional access module; and the second device is a smart card.

49. The method of claim 44, wherein the first device is a television decoder.

50. Apparatus to provide a secure communication, the apparatus comprising:

a first device including at least one microprocessor and being configured to:

generate a first key and an authentication number, both associated with the first device;

encrypt a first message, including the first key and the authentication number; and transfer the first encrypted message; and a second device including at least one microprocessor and being configured to:

receive the first encrypted message, decrypt the first encrypted message to obtain the first key and the authentication number, encrypt a second message containing the authentication number, using the first key, and return the second encrypted message to the first device; the first device being further configured to:

decrypt the second encrypted message for verification of the authentication number, upon which, the apparatus uses the first key to encrypt at least one subsequent transmission between the first and second devices.

51. The apparatus of claim 50, wherein the first key is a random number.

52. The apparatus of claim 51, wherein the authentication number includes a random number.

53. The apparatus of claim 50, wherein, after verification, the first device forwards at least one message including an encrypted control word to the second device, upon receipt of which, the second device extracts the control word; and returns the control word to the first device in a message encrypted using the first key.

54. The apparatus of claim 52, wherein the first device is a conditional access module; and the second device is a smart card.

55. The apparatus of claim 52, wherein the first device is a television decoder.

* * * * *